Dickinson & White,
Wind Wheel,
No. 13,288. Patented July 17, 1855.
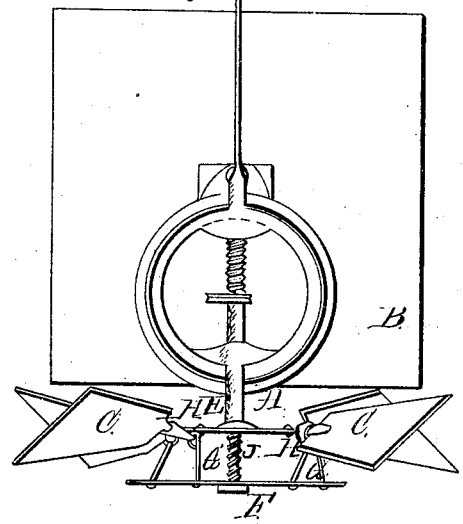
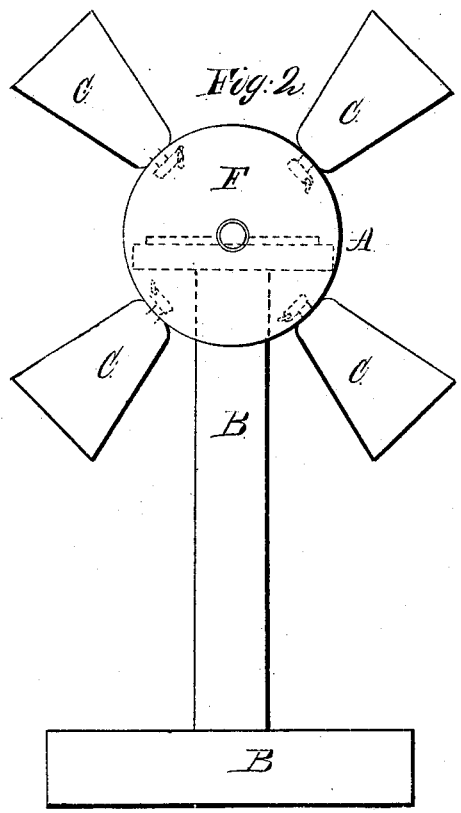

UNITED STATES PATENT OFFICE.

JOSEPH DICKINSON AND OLIVER WHITE, OF RICHMOND, INDIANA.

SELF-REGULATING WINDMILL.

Specification forming part of Letters Patent No. 13,288, dated July 17, 1855.

*To all whom it may concern:*

Be it known that we, JOSEPH DICKINSON and OLIVER WHITE, of Richmond, in the county of Wayne, Indiana, have invented a new and useful Improvement in Windmills; and we do hereby declare that the following is a full, clear, and exact description thereof, reference being had to the accompanying drawings, making a part of this specification.

The nature of our invention consists in a windmill for operating a water-pump for supplying cattle or other purposes, so constructed and arranged that its vanes shall be self-adjustable to the force of the wind, whereby its motion is regulated to any given and uniform speed, and if the wind should be too strong it is stopped, and if the wind should come in heavy squalls it and its parts are prevented from being injured by the action of the wind alone without the least attention, thus producing a self operating and adjustable power capable of supplying troughs or vessels with water for cattle or performing similar purposes on a farm or elsewhere.

In said drawings, Figure 1 represents a top or plan view, and Fig. 2 a front elevation, of our improved windmill or power, in both of which the same letters are used to designate like parts.

A is the wind-wheel, which is arranged and adjusted with the stationary frame B, so as to rotate on vertical and horizontal axes in the usual manner. This we will not further describe, as our improvement does not relate to it and it is well understood by those skilled in the art of windmill construction.

c are the vanes, which radiate from the shaft E in the usual manner; and our invention consists in applying to them an arrangement by which their angle to the plane of the periphery of the wheel on which they are adjusted will be regulated and governed by and to the force of the wind, producing a steady and uniform speed of the machinery without attention, or by the force of the wind alone. We effect this in a very simple and cheap manner.

F is a face-plate or circular disk of the required area or surface—say one-half that of the diameter of the whole wheel, more or less—which plate is placed vertically or at right angles to the main shaft E, so as to receive the full force of the wind, and connected with the shanks of the vanes c by rods G and cranks H or analogous contrivances, and provided with a counterbalancing power or spring I, (which is proportioned in size or power to that of the wheel, plate, and speed at which the machinery is desired to run,) all of which are so arranged as that the wind, acting upon the said face-plate or disk, will operate or serve as a regulator or governor of the speed of the machinery and prevent the wind in its fury from injuring the machinery, and its variable force from varying the speed of the same.

By reference to the drawings the construction and operation of this invention will be readily understood, so as to construct and build the same without further description. The face-plate or disk must be proportioned to the size of the wheel, and the spring to them both, so that a given speed of the machinery will be obtained, which can be easily determined by practice or calculation. When properly adjusted in this manner, the machinery will govern itself and maintain a uniform speed in stormy weather, with variable winds, and under circumstances where ordinary mills would require careful attention, the full force of the wind acting upon the face-plate or disk, and it acting upon the vanes, changing their angle with the plane of the periphery of the wheel. If the wind should blow in squalls the vanes will be constantly varied in their angle, causing the same amount of force from the wind to act upon them, and if the wind should be too powerful the vanes will be brought parallel with the main shaft or in that position in which the wind will have no power to propel the wheel and the machinery will stop of itself.

Having thus fully described our invention, what we claim as new, and desire to secure by Letters Patent, is—

Applying to a wind mill or motor a governor or regulator which shall change the angle of the vanes with the plane of the periphery of the wheel, thus regulating the force of the wind upon them by the force of the wind or motive power alone by means of the face-plate F, spring I, rods G, and cranks H, or their equivalents, constituting an arrangement effecting the purposes herein set forth.

In testimony whereof we have hereunto signed our names in the presence of two subscribing witnesses.

JOSEPH DICKINSON.
              OLIVER WHITE.

Witnesses:
  JOHN FINLEY,
  CHARLES DICKINSON.